United States Patent
MacDonald et al.

(10) Patent No.: US 6,860,988 B2
(45) Date of Patent: Mar. 1, 2005

(54) FLUID FILTRATION SYSTEM WITH FLUID FLOW METER

(75) Inventors: I. Scott MacDonald, Toronto (CA); Edmond Leveson Rampen, Oakville (CA)

(73) Assignee: Envirogard Products Ltd., Richmond Hill (CA)

( * ) Notice: Subject to any disclaimer, the term of this patent is extended or adjusted under 35 U.S.C. 154(b) by 23 days.

(21) Appl. No.: 10/325,944

(22) Filed: Dec. 23, 2002

(65) Prior Publication Data

US 2004/0118755 A1 Jun. 24, 2004

(51) Int. Cl.[7] .................. G01F 1/115; B01D 35/143
(52) U.S. Cl. .................. 210/87; 702/100; 340/610; 73/861.89; 73/861; 73/94
(58) Field of Search .................. 340/610, 606; 702/45, 46, 100; 116/274; 73/861.84, 861.89, 861.91, 861.92, 861.93, 861.94; 210/87, 85

(56) References Cited

U.S. PATENT DOCUMENTS

| | | |
|---|---|---|
| 1,893,233 A | 1/1933 | Hull |
| 2,827,856 A | 3/1958 | Zozulin |
| 3,053,087 A | 9/1962 | Waugh |
| 3,264,871 A | 8/1966 | Beynon |
| 3,321,081 A | 5/1967 | Willinger |
| 3,364,743 A | 1/1968 | Clinton |
| 3,504,987 A | 4/1970 | Dee |
| 3,610,039 A | 10/1971 | Althouse et al. |
| 3,636,767 A | 1/1972 | Duffy |
| 3,794,168 A | 2/1974 | Perkins |
| 3,922,525 A | 11/1975 | Kozak et al. |
| 3,941,077 A | 3/1976 | Moore |
| 4,012,958 A | 3/1977 | Taylor |
| 4,074,157 A | 2/1978 | Lace |
| 4,185,215 A | 1/1980 | Montagu |
| 5,372,048 A | 12/1994 | Dunbar |
| 5,527,451 A | 6/1996 | Hembree et al. |
| 5,845,597 A | 12/1998 | Karpal |
| 5,876,610 A | 3/1999 | Clack et al. |
| 5,935,426 A | 8/1999 | Giordino et al. |
| 5,976,362 A | 11/1999 | Wadsworth et al. |
| 6,012,339 A * | 1/2000 | Genack et al. ........... 73/861.77 |
| 6,123,837 A | 9/2000 | Wadsworth et al. |
| 6,481,293 B1 * | 11/2002 | Walczak et al. ......... 73/861.77 |
| 2002/0128792 A1 * | 9/2002 | Kopl et al. .................. 702/100 |

* cited by examiner

*Primary Examiner*—Terry K. Cecil
(74) *Attorney, Agent, or Firm*—Ingrid E. Schmidt (57) ABSTRACT

A water filtration system incorporating a fluid flow meter has a modular turbine casing assembly in which a turbine is located between upstream and downstream casing elements of identical shape and formed to be stacked so as to trap the turbine in between. The turbine is magnetized and rotation of the turbine is monitored electronically with a reed switch having a lead wire which is positioned proximate to the turbine to sense fluctuations in a magnetic field created by the turbine on rotation of the turbine. The reed switch housing itself is disposed at a location remote from the turbine. The system further includes processor for calculating an adjusted accumulated count data for low volumetric flow rates which are less than a predetermined threshold value. Advantageously, the invention can be used to reliably measure very low flow rates with very little power drawn.

14 Claims, 8 Drawing Sheets

FLUID FILTRATION SYSTEM WITH FLUID FLOW METER

FIELD OF THE INVENTION

This invention relates to a fluid filtration system, in particular, to a water filtration system for domestic use and which includes a flow meter for alerting the user when filtration media needs to be replaced in the filtration system.

BACKGROUND OF THE INVENTION

While municipal water supplies are generally very good and provide acceptable quality drinking water, many home owners prefer to filter the main water supply in order to provide a safer, better tasting water in the home. Conveniently, such filtration equipment may be installed at the point of use under a sink near a faucet. The water supply is allowed to pass through a selected number of filter cartridges for removing sediment, dirt, rust and algae; to absorb objectionable taste, odours, colours and chlorine; and to reduce contaminants such as pesticides, and also to trap and kill harmful bacteria, cysts, and protozoa, as the case may be. Depending on the nature of the filter media used to treat the water, and the quality of the source water, it may become necessary to replace the filter on a periodic basis. In the case of a flow through water filter system, a convenient measure of when the filter media has reached its maximum capacity is to monitor the time during which the cartridge is in use. Alternatively, it is desirable to measure the volume of water being treated by the filter assembly.

For example, it is suggested by manufacturers that certain activated carbon cartridges be replaced typically every four months or six months depending on the cartridge and that a ceramic cartridge should be replaced every twelve months. It is however recognized that over a period of for example six months, different users will consume more or less water. It is therefore preferable to determine the volumetric throughput of the filter assembly and to change the filter media accordingly. For example, it is suggested that an activated carbon filter media should be replaced before a period of six months has expired if the throughput exceeds 600 gallons, failing which, the quality of the water may be adversely affected.

While water flow meters are generally well known, they are generally used by utility supply companies monitoring large volumetric flows. One of the problems which needs to be addressed in a domestic water supply environment is that the water volume throughput is intermittent at the point of use and may also have a very small flow rate. It then becomes challenging to provide accurate measurements of volume flow rate at a reasonable cost. Flow meters which incorporate a magnetized turbine are described in U.S. Pat. No. 3,053,087; U.S. Pat. No. 3,610,039; U.S. Pat. No. 5,372,048; and U.S. Pat. No. 5,876,610.

An object of this invention is to provide a fluid flow meter which is inexpensive to manufacture, which can reedily be incorporated into a conduit of a standard water filtration system and which will operate satisfactorily at the anticipated low flow rate prevalent in domestic water filtration units.

SUMMARY OF THE INVENTION

In accordance with a first aspect of the invention, there is provided a modular turbine casing assembly having an upstream casing element, a downstream casing element, and a turbine located between said upstream and downstream casing elements. The upstream and downstream casing elements each have a cylindrical wall that defines an internal shoulder at an upstream end and a cooperating external shoulder at a downstream end so that the upstream and downstream casing elements may be stacked. Each of the upstream and downstream casing elements has a turbine locator consisting of a central hub and a number of radially extending ribs coupling the hub to a circumferential rim adjacent to the cylindrical wall, each hub having a spindle that extends toward the upstream end of the casing element and an opposing dimple exposed to the downstream end of the casing element. The turbine has a central hub and a number of radially extending turbine blades coupling the hub to a peripheral collar of predetermined width, the central hub having an axially extending spindle on an upstream side and a recess on a downstream side adapted to cooperate with the dimple of the upstream casing element and the spindle of the downstream casing element. The turbine is adapted to be magnetized so that rotation of the turbine can be monitored electronically and the peripheral collar of the turbine has a height and diameter adapted to locate inside the cylindrical wall of the downstream casing element so that the turbine may rotate freely between the upstream and downstream casing elements.

In accordance with another aspect of the invention, a water filtration system is provided which includes electronic sensing means for counting the revolutions of a magnetized turbine, the electronic sensing means including a reed switch mounted in a reed housing having lead wires for conducting electricity in and out of the reed switch, a selected one of said lead wires being positioned in a receiving groove formed in the head cover for a water filtration system which is removably coupled to a sump container for receiving filtration media. The receiving groove is proximate to the turbine to sense fluctuations in a magnetic field created by the turbine upon rotation of the turbine. Conveniently, the reed housing itself may be disposed in the head cover at a location which is remote from the turbine.

In accordance with yet another aspect of the invention, the fluid filtration system includes a fluid flow meter that is characterized by a substantially constant output having a predetermined variance above a threshold volumetric flow rate and a substantially linear relationship between output and volumetric flow rate over a predetermined range of volumetric flow rate below said threshold. The fluid flow meter includes a revolution counter commensurate with volumetric flow for generating count data N; an elapsed time counter for generating a lapsed time data T; processing means for adjusting the count data N by multiplying N with a predetermined factor F. The factor F is equal to one above a threshold count rate and is greater than one below the threshold count rate. Output means are included for alerting a user when the adjusted accumulated count data $\Sigma NF$ has exceeded a predetermined value selected to indicate that the predetermined volume of fluid has been filtered or when the lapsed time exceeds a predetermined period, whichever is reached first.

BRIEF DESCRIPTION OF THE DRAWINGS

The above mentioned aspects of the invention and associated features will now be described with reference being made to the accompanying drawings in which.

DETAILED DESCRIPTION WITH REFERENCE TO DRAWINGS

Figure 1:
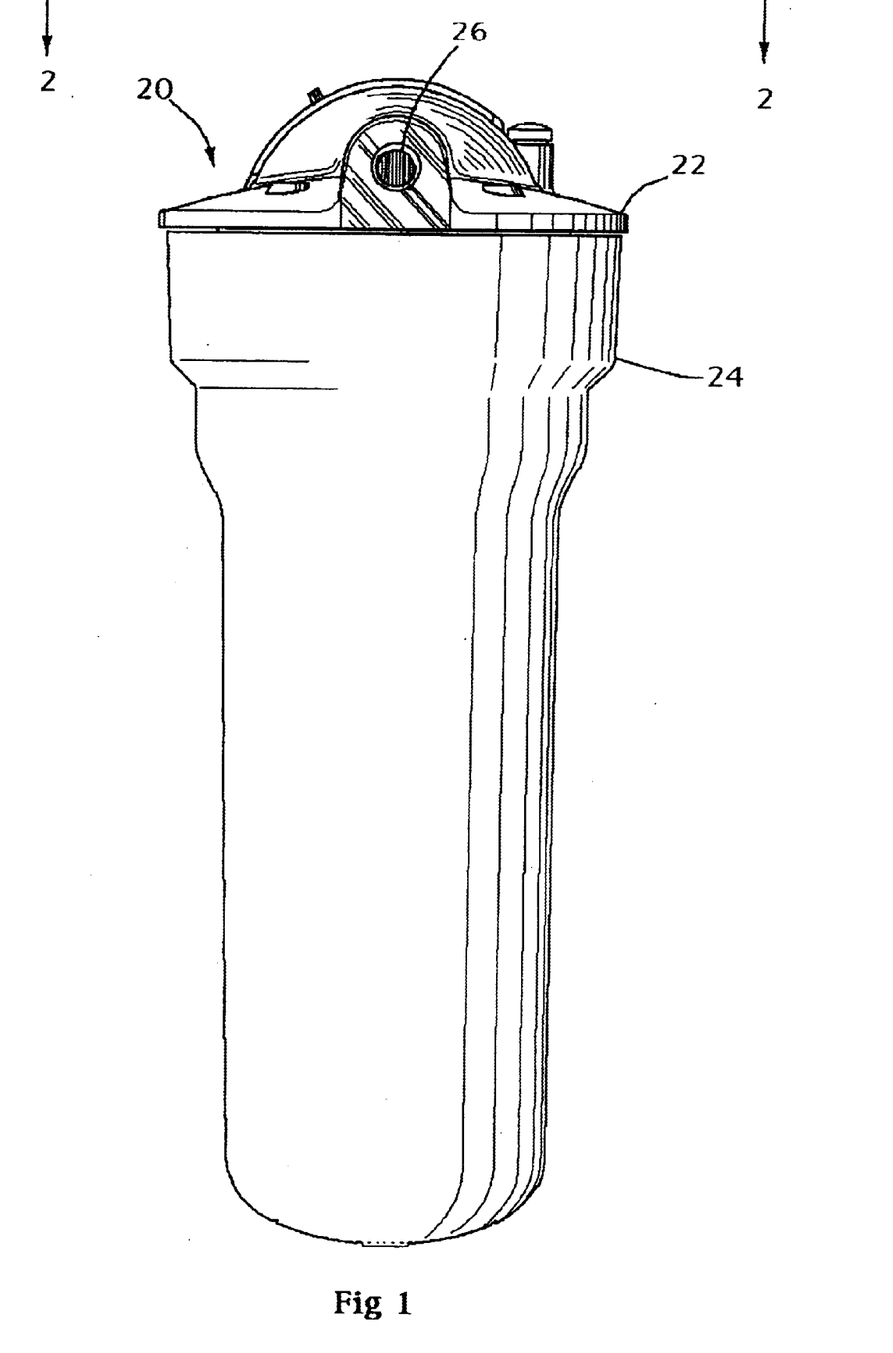
FIG. 1 is a side elevation view of a water filtration housing and cartridge assembly.
Figure 2:
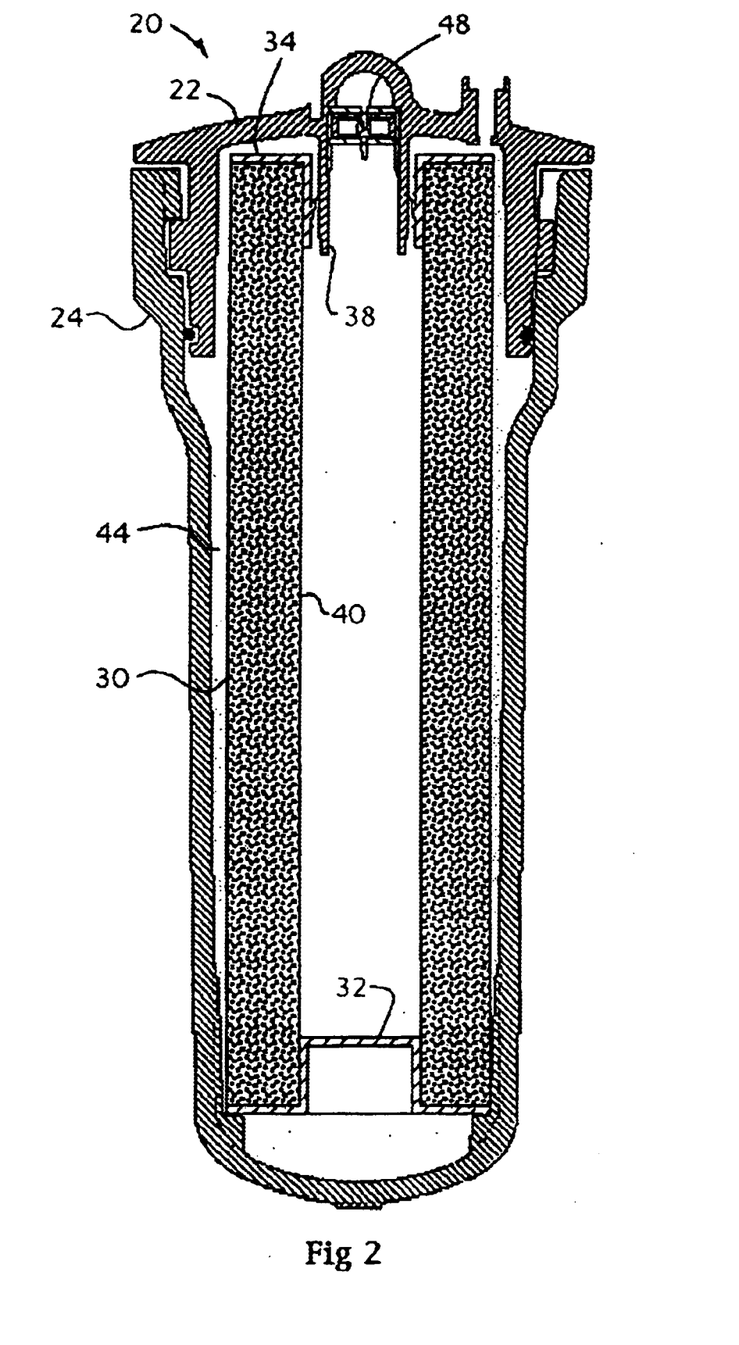
FIG. 2 is a cross-sectional view drawn through line 2—2 of FIG. 1.

A typical water filtration housing and cartridge assembly is generally indicated in the drawings by reference numeral 20. The housing and cartridge assembly 20 has a head cover 22 which is removably attached to a sump container 24. The head cover 22 has a raw water inlet 26 formed therein and a clean water outlet 28 (FIG. 3) is formed opposite from the raw water inlet 26. The raw water inlet 26 and clean water outlet 28 are disposed to be in fluid communication with a cold water supply line (not shown). Typically, the sump 24 is supported by means of a bracket to a fixed structure such as a cabinet (not shown). The sump container 24 is elongate and has a closed bottom end which is generally convex. The diameter of the sump container is designed to accommodate, in a close fitting manner, a cylindrical filter media 30 which, according to the intended application, may be a self, disinfecting, silver impregnated ceramic cartridge or a disposable activated carbon cartridge. In the embodiment described, the filter media will be assumed to be an activated carbon cartridge which requires replacement every six months or when a volumetric throughput of 600 gallons has been filtered. It will be seen from FIG. 3 that the filter media cartridge 30 has a bottom cap 32 and an annular top cap 34 which seals the top and bottom ends thereof. In addition, the head cover 22 has a central well or spigot 38 which extends axially into the sump container 24 and is dimensioned to nest inside a central core 40 formed in the filter media cartridge 30. Accordingly, any water or fluid entering the water filtration housing and cartridge assembly 20 through the raw water inlet 26 as indicated by arrow 42 is forced to travel from the head cover 22 into the sump container 24 through an annular passage 44 defined between the sump container 24 and the filter media cartridge 30, through the filter media cartridge 30 and into the central core 40 before emerging through the spigot 38 into the head cover 22 and out the clean water outlet 28 as indicated by arrow 46.

Figure 3:
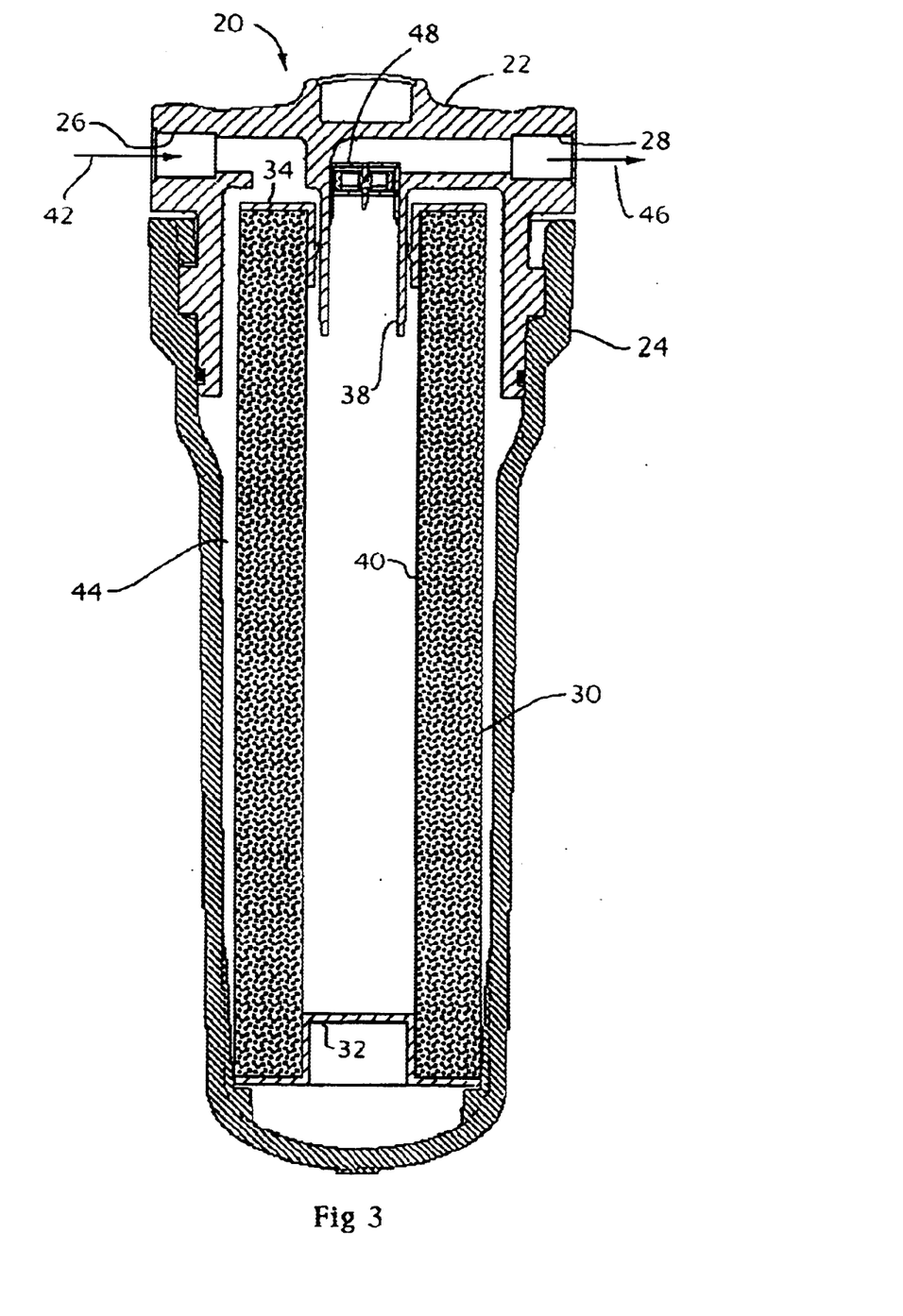
FIG. 3 is a cross-sectional view through the water filtration housing and cartridge assembly of FIG. 1 drawn on a line orthogonal to 2—2.

In accordance with a first aspect of the invention, there is provided a modular turbine casing assembly generally indicated in the drawings by reference numeral 48. The modular turbine casing assembly 48 is conveniently disposed inside the spigot 38 in order to lie in the path of clean water emerging through the central aperture 40 of the filter media cartridge 30 as it enters the head cover 22 before emerging from the clean water outlet 28.

Figure 4:
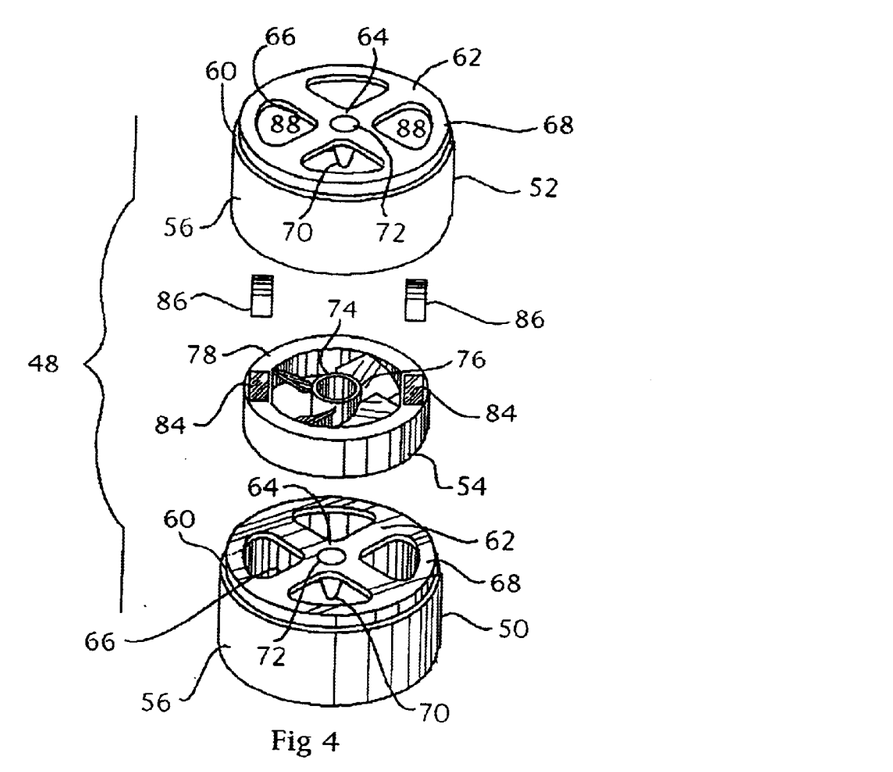
FIG. 4 is an assembly drawing of a modular turbine casing assembly in accordance with the invention.

The modular turbine casing assembly 48 is shown in more detail in FIG. 4 and comprises an upstream casing element 50, a downstream casing element 52 and a turbine 54 located between the upstream and downstream casing elements. The modular turbine casing assembly 48 is shown in cross section and in an assembled configuration in FIG. 5 of the drawings. The upstream casing element 50 and the downstream casing element 52 are identical in shape and may therefore be molded using a single cavity or multiple identical cavities. Like parts of the upstream and downstream casing elements 50, 52 will therefore be identified by like numerals. Acetal is a suitable material for fabricating the turbine casing.

Figure 5:
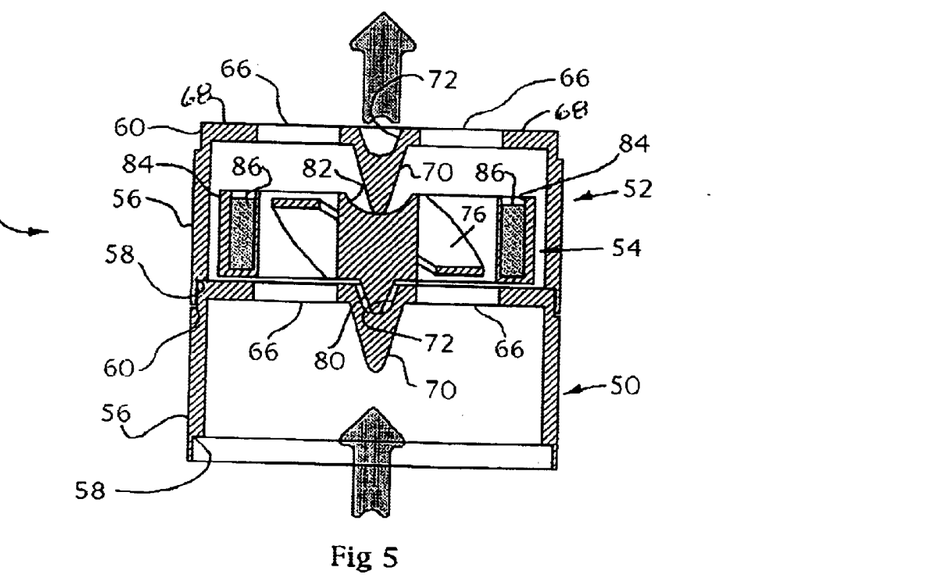
FIG. 5 is a cross-sectional drawn to a larger scale through the modular turbine casing assembly of FIG. 4.

Each of the upstream and downstream casing elements 50, 52 has a cylindrical wall 56 which can be made to a thickness of 0.075 in and which defines an internal shoulder 58 at an upstream end and a cooperating external shoulder 60 at a downstream end so that said upstream and downstream casing elements may be stacked.

Each said upstream and downstream casing elements 50, 52 has a turbine locator 62 consisting of a central hub 64 and a number of radially extending ribs 66 coupling the hub to a circumferential rim 68 adjacent to the cylindrical wall 56. Each hub 64 has a spindle 70 extending toward the upstream end of the casing element and an opposing dimple 72 exposed to the downstream end of the casing element.

The purpose of the turbine locator 62 is to locate the turbine 54 between the upstream casing element 50 and the downstream casing element 52 as will be explained. The turbine 54 has a central hub 74 and a number of radially extending turbine blades 76 coupling the hub 74 to a peripheral collar 78. The turbine blades 76 are oriented transversely with respect to the collar 78 so that any fluid flow impinging on the blades will cause the turbine 54 to rotate. The central turbine hub 74 has an axially extending spindle 80 on an upstream side and a recess 82 on a downstream side adapted to cooperate with the dimple 72 of the upstream casing element and the spindle 70 of the downstream casing element respectively.

The turbine 54 has a pair of oppositely disposed pockets 84 formed in the collar 78 for receiving a pair of magnets 86. The turbine 54 is thereby adapted to be magnetized so that rotation of the turbine can be monitored electronically. The peripheral collar 78 is dimensioned to locate inside the cylindrical wall 56 of the downstream casing element 52 so that the turbine 54 may rotate freely between the upstream and downstream casing elements 50, 52. Conveniently, the turbine locator 62 is located at the downstream end of the associated cylindrical wall 56.

It will be noted that dimples 72 and recess 82 are all oriented so as to be exposed to the downstream end of the modular turbine casing assembly 48 and this feature conveniently minimizes entrapment of any loose filter particles which might otherwise interfere with the rotational motion of the turbine 54 where the spindles 70, 80 bear on the adjacent recess 82 and dimple 72.

The circumferential rim 68 of the turbine locator 62 has a width which is commensurate with the width of the peripheral collar 78 of the turbine 54 so that turbulence of any fluid flowing through the assembly 48 is minimized. Further, the radially extending ribs 66 define openings 88 therebetween which are adapted to maximize fluid flow over the turbine blades 76.

It will therefore be appreciated that the modular turbine casing assembly 48 can be assembled into a neat capsule which may conveniently be inserted into a fluid outlet of commensurate diameter. In the example given, the modular turbine casing assembly 48 locates in the spigot 38. Because there are so few parts requiring assembly, there is very little structural interference with water flowing through the modular turbine casing assembly 48 and this allows the assembly to be responsive to very low flow rates. Appropriate location of the modular turbine casing assembly 48 in a water filtration housing and housing and cartridge assembly 20 will minimize any inaccuracies resulting from turbulence in the water flow. For example, it will be seen from FIG. 3 of the accompanying drawings that the modular turbine casing assembly is downwardly spaced from the clean water outlet passage which terminates in the clean water outlet 28.

Figure 6:
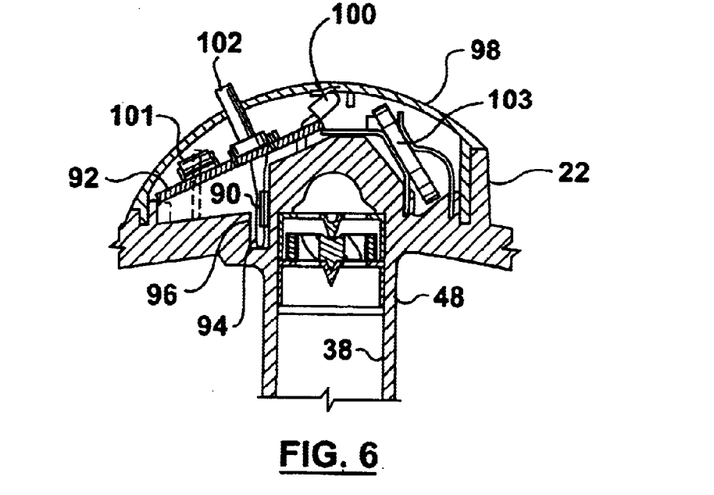
FIG. 6 is a cross-sectional view of a portion of a head cover for the water filtration housing and housing and cartridge assembly of FIG. 1.
Figure 7:
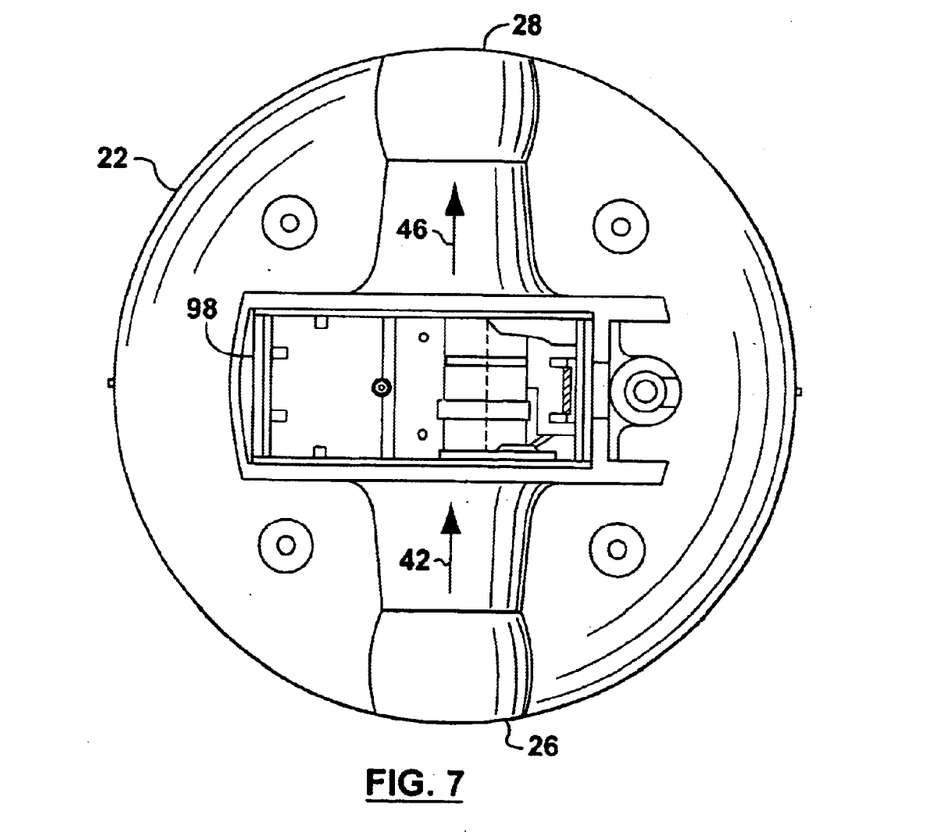
FIG. 7 is a top plan view of the head cover forming part of the water filtration housing and housing and cartridge assembly.

In accordance with a second aspect of the invention, electronic sensing means are provided for counting the revolutions of the magnetized turbine 54 in order to determine volumetric water flow through the water filtration housing and housing and cartridge assembly. Most preferably, the electronic sensing means will include a reed switch mounted in a reed switch housing 90 electronically coupled to an electronic circuit board 92 which is mounted to the head cover 22 as shown in FIG. 6. The reed switch housing 90 has lead wires for conducting electricity into and out of the reed switch and one of the lead wires 94 is positioned in a receiving groove 96 formed in the head cover 22 at a location proximate to the turbine 54 to sense fluctuations in a magnetic field created by the turbine 54 on rotation of the turbine. This allows the reed switch housing 90 to be disposed in the head cover 22 at a location which is remote from the turbine 54. In order to have sensitivity to changes in magnetic fields at very low fluid flow rates, the reed switch is selected to have a small diameter lead wire of less than 0.020 inches. A preferred reed switch will have a miniature single pole, single throw, double-ended reed switch with normally open contacts and containing two magnetically actuated reeds. The fine diameter wire is critical to allow operation at low flow rates as otherwise the attractive force with the magnetic field is so high that the turbine 54 could slow down or otherwise interfere with the motion of the turbine and the readings would be inaccurate. Conveniently, by locating the lead wire 94 close to the turbine 54, the reed switch itself may be spaced as far as 0.250 inches away from the magnetic source. The electronic circuit board 92 is shielded by a translucent cover 98 through which a user may observe indicator lights 100 and have access to a reset button 102 for initializing the electronic circuit board. A capacitor 101 powered by a watch size battery 103 is electrically coupled to the reed switch.

The entire system is powered with very little energy. Conveniently, a three volt coin type battery (CR2032) is sufficient to operate the fluid flow meter in accordance with the invention. It is expected that the battery life will be approximately two years and the unit may have a respective visual alarm to indicate whether the battery is still operating.

Figure 8:
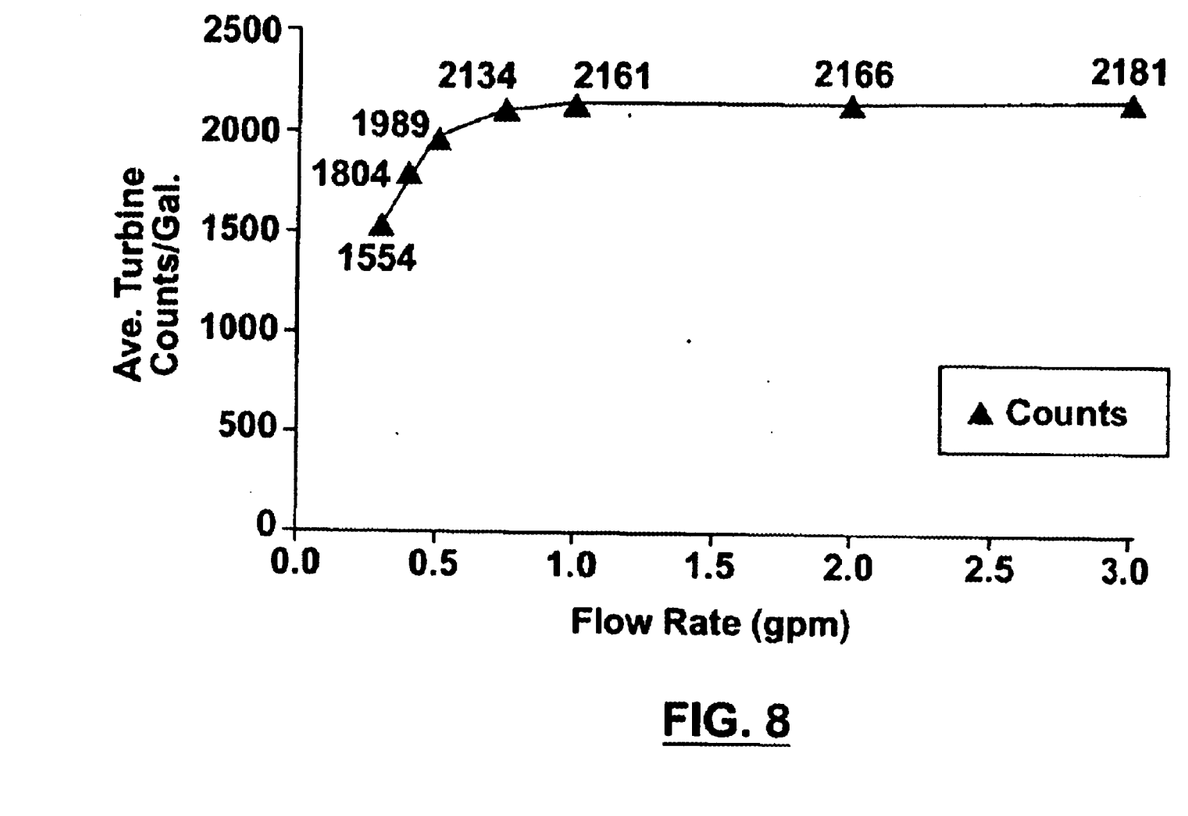
FIG. 8 is a calibration graph correlating flow rate with turbine count.

Operational tests conducted on a fluid filtration system incorporating the water filtration housing and housing and cartridge assembly 20 and modular turbine casing assembly 48 in accordance with the invention and coupled to the electronic circuit board 92 with reed switch circuitry to define a fluid flow meter show that the turbine counts per gallon are relatively constant above threshold volumetric flow rates of 0.5 gallons per minute while there is a substantially linear relationship between output and volumetric flow rates below 0.5 gallons per minute and exceeding 0.25 gallons per minute. A graphical output illustrating the observations is shown in FIG. 8 of the accompanying drawings.

Figure 9:
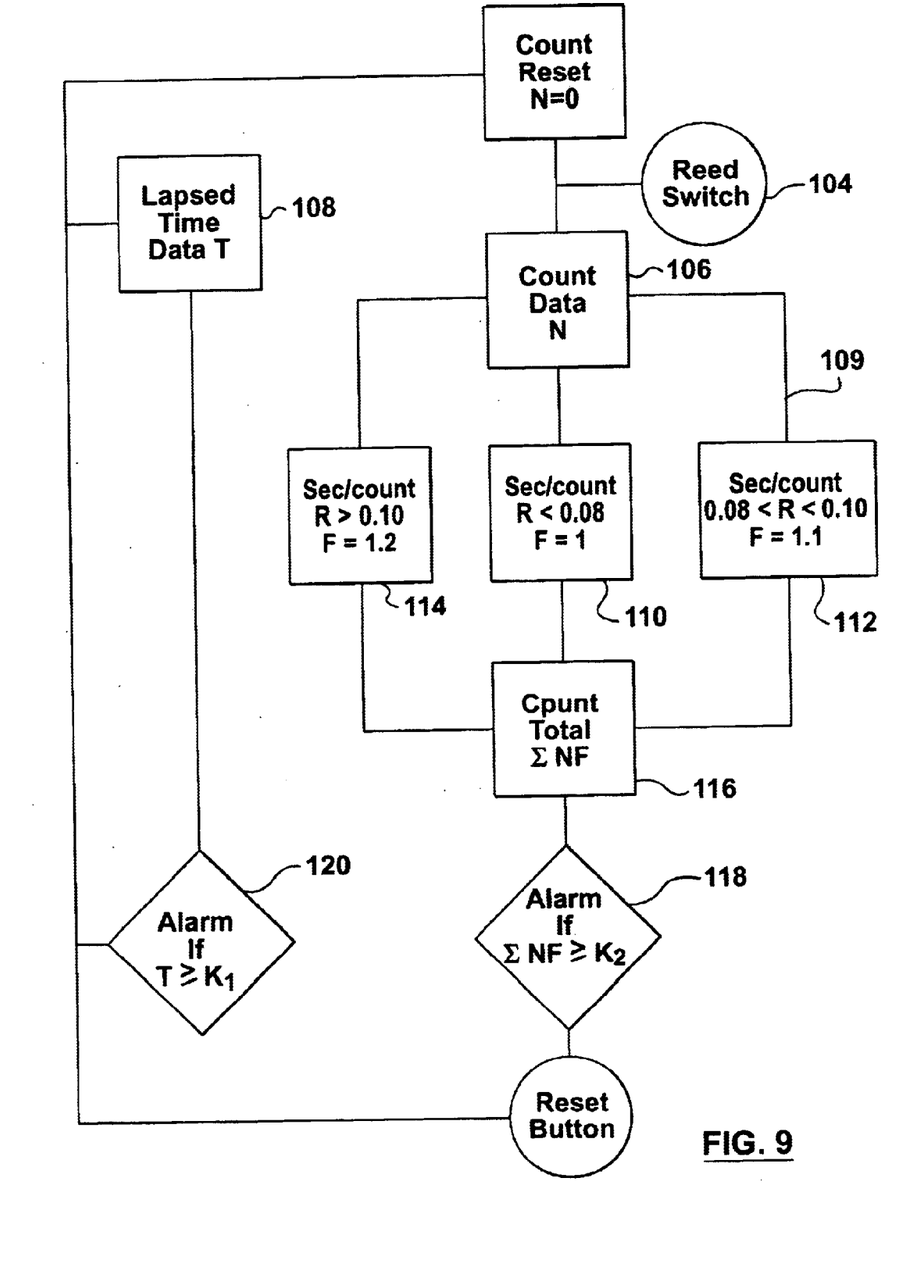
FIG. 9 is a schematic flow chart illustrating a process for adjusting accumulated count data and user alert.

A schematic flow chart of a fluid flow meter made in accordance with the invention is illustrated in FIG. 9. The fluid flow meter includes a fluid revolution counter 104 to generate an accumulated count data N (106) generated from the reed switch pulses on each rotation of the turbine 54. In addition, the fluid flow meter has an elapsed time counter 108 for generating lapsed time data T. Processing means 109 then compares a count rate R to a threshold value of the count rate in order to select a predetermined multiplying factor F for adjusting the accumulated count data N. If the count rate is less than 0.08 sec/count (110) in the sample given, the adjustment factor is 1 and therefore there is no change to the count data N. However, if the count rate R is calculated to be more than 0.08 sec/count a further test is applied to ascertain whether the adjustment factor should be F=1.1 at a count rate less than 0.10 sec/count (112) or F=1.2 for a count rate R greater than 0.10 sec/count (114). The adjustment factor F is then multiplied by the count data N (116) and added to a cumulative total ΣNF and compared to a predetermined value in order to determine whether an alarm must be activated. Activation of the alarm is indicated in Box 118. In the embodiment shown, the alarm is a visual alarm in which the indicator light 100 will flash periodically at a preset volume of 600 gallons or lapsed time of six months (120) whichever is reached first.

After replacement of an activated carbon filter media, the reset button 102 maybe depressed to initialize the count data N and lapsed time data T. Additional alarms may be incorporated into the fluid flow meter which are activated, for example, in the case of a ceramic filter media, only when a predetermined time limit of twelve months has elapsed. The visual alarm could be a different colour so that where the water filtration system includes a tandem unit comprising an activated carbon filter and a ceramic filter disposed side by side, the appropriate filter media is serviced.

It will be understood that several variations may be made to the above described embodiment of the invention within the scope of the appended claims. In particular, the modular tubular casing assembly may be located in any suitable conduit through which a fluid flows in order to measure the volumetric flow of the fluid through the conduit.

Figure 10:
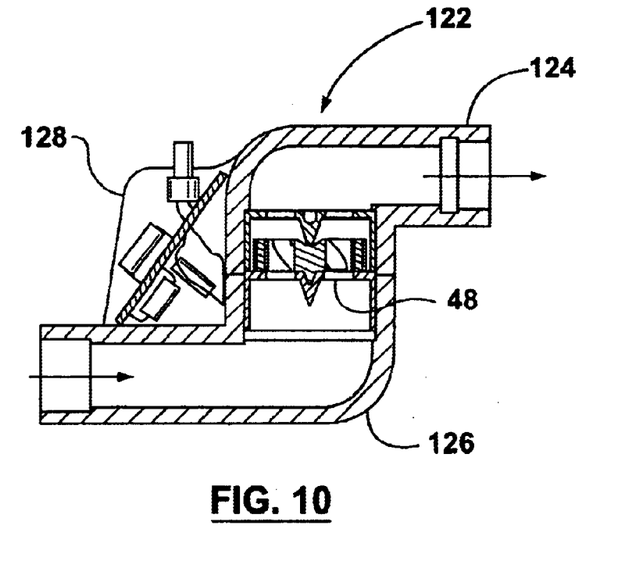
FIGS. 10 and 11 are cross-sectional views showing the modular turbine casing assembly according to the invention disposed in alternative conduits.

In FIG. 10, the modular turbine casing assembly 48 is shown incorporated into an S-shaped elbow conduit 122 consisting of two components 124 and 120 joined together. Electronic sensing means 128 are disposed outside the elbow to sense the rotations of the turbine in the modular turbine casing assembly 48. Note that the modular turbine casing assembly 48 is downwardly spaced in the exit component 124 so that fluid may exit the turbine into a transverse fluid stream.

Figure 11:
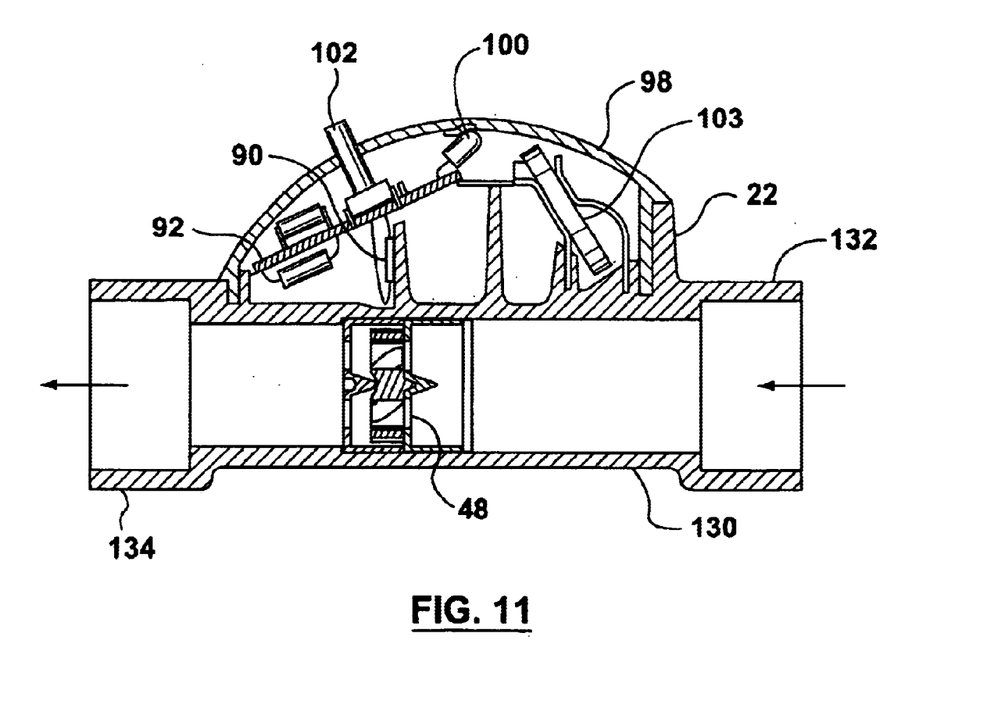

In FIG. 11, the modular turbine casing assembly 48 is shown incorporated into a straight conduit 130 having oppositely disposed bell-shaped ends 132, 134 so that it may be retrofitted into existing water conduct installations.

It will also be understood that the processing means incorporated into the fluid flow meter according to the invention may be modified to provide a number of different alarms according to the nature of the filter media being used. Other such variations will be apparent to those skilled in the art.

What is claimed is:

1. Modular turbine casing assembly having
    an upstream casing element, a downstream casing element, and a turbine located between said upstream and downstream casing elements,
    each said upstream and downstream casing elements having a cylindrical wall defining an internal shoulder at an upstream end, and a cooperating external shoulder at a downstream end so that said upstream and downstream casing elements may be stacked, each said upstream and downstream casing elements having a turbine locator consisting of a central hub and a number of radially extending ribs coupling the hub to a circumferential rim adjacent to said cylindrical wall, each hub having a spindle extending toward the upstream end of the casing element and an opposing dimple exposed to the downstream end of the casing element, the turbine having a central hub and a number of radially extending turbine blades coupling the hub to a peripheral collar of predetermined width, the central hub having an axially extending spindle on an upstream side and a recess on a downstream side adapted to cooperate with the dimple of the upstream casing element and the spindle of the downstream casing element respectively, the turbine being adapted to be magnetized so that rotation of the turbine can be monitored electronically, and the peripheral collar having a height and diameter adapted to locate inside the cylindrical wall of the downstream casing element so that the turbine may rotate freely between the upstream and downstream casing elements.

2. Modular turbine casing assembly according to claim 1 in which the peripheral outer collar has a pair of oppositely disposed pockets for receiving a pair of discrete magnets.

3. Modular turbine casing assembly according to claim 1 in which the turbine locator is located at the downstream end of the associated cylindrical wall.

4. Modular turbine casing assembly according to claim 1 in which the circumferential rim of the turbine locator has a width which is commensurate with the width of the peripheral collar of the turbine so that turbulence of any fluid flowing through the assembly is minimized.

5. Modular turbine casing assembly according to claim 1 in which the radially extending ribs define openings therebetween which are adapted to maximize fluid flow over the turbine blades.

6. A fluid flow conduit having a modular turbine casing assembly according to claim 1, the fluid flow conduit having ends adapted to be coupled to a fluid flow installation and the modular turbine assembly being disposed in the said fluid flow conduct to allow fluid to exit the turbine into a fluid stream, the fluid flow conduit further having electronic sensing means for counting the revolutions of the turbine.

7. A fluid flow conduit according to claim 6 in which the electronic sensing means includes a reed switch mounted in a reed housing having lead wires for conducting electricity into and out of the reed switch, a selected one of said lead wires being positioned at a location proximate to said turbine to sense fluctuations in a magnetic field created by said turbine upon rotation thereof, said reed housing being disposed at a location remote from the turbine.

8. A fluid flow conduit according to claim 6 having a fluid flow meter, the fluid flow meter having electronic sensing means for generating count data N corresponding to the revolutions of the turbine, the electronic sensing means including a reed switch mounted in a reed housing having lead wires for conducting electricity into and out of the reed switch, a selected one of said lead wires being positioned in a receiving groove formed in a head cover at a location proximate to said turbine to sense fluctuations in a magnetic field created by said turbine upon rotation thereof, said reed housing being disposed in the head cover at a location remote from the turbine;

the fluid flow meter further having a lapsed time counter for generating a lapsed time data T;

processing means for adjusting the count data N by multiplying N with a predetermined factor F, said factor F being equal to 1 when a threshold count rate is exceeded and F being greater than 1 when the count rate is below said threshold count rate; and output means for alerting a user when an adjusted accumulated count data $\Sigma NF$ has exceeded a predetermined value selected to indicate that a pre-determined volume of fluid has been filtered or when the lapsed time data T has exceeded a predetermined period.

9. A water filtration system having a head cover removably coupled to a sump container for receiving filtration media therein, the head cover having a first passage defining a raw water inlet and a second passage defining a clean water outlet, both said raw water inlet and said clean water outlets being in fluid communication with said sump container, and electronic sensing means for counting the revolutions of a magnetized turbine adapted to determine volumetric water flow through the water filtration system, the electronic sensing means including a reed switch mounted in a reed housing having lead wires for conducting electricity into and out of the reed switch, a selected one of said lead wires being positioned in a receiving groove formed in the head cover at a location proximate to said turbine to sense fluctuations in a magnetic field created by said turbine upon rotation thereof, said reed housing being disposed in the head cover at a location remote from the turbine.

10. A water filtration system according to claim 9 in which the reed switch is selected to have a small diameter lead wire of less than 0.020 inches to minimize any counter rotating effect on the magnetized turbine.

11. A water filtration system having a head cover removably coupled to a sump container for receiving filtration media therein, the head cover having a first passage defining a raw water inlet and a second passage defining a clean water outlet, both said raw water inlet and said clean water outlets being in fluid communication with said sump container, a modular turbine casing assembly disposed in said clean water outlet, the modular turbine casing assembly having an upstream casing element, a downstream casing element, and a turbine located between said upstream and downstream casing elements, each said upstream and downstream casing elements having a cylindrical wall defining an internal shoulder at an upstream end, and a cooperating external shoulder at a downstream end so that said upstream and downstream casing elements may be stacked, each said upstream and downstream casing elements having a turbine locator consisting of a central hub and a number of radially extending ribs coupling the hub to a circumferential rim adjacent to said cylindrical wall, each hub having a spindle extending toward the upstream end of the casing element and an opposing dimple exposed to the downstream end of the casing element, the turbine having a central hub and a number of radially extending turbine blades coupling the hub to a peripheral collar of predetermined width, the central hub having an axially extending spindle on an upstream side and a recess on a downstream side adapted to cooperate with the dimple of the upstream casing element and the spindle of the downstream casing element respectively, the turbine being adapted to be magnetized so that rotation of the turbine can be monitored electronically, and the peripheral collar having a height and diameter adapted to locate inside the cylindrical wall of the down stream casing element so that the turbine may rotate freely between the upstream and downstream casing elements;

and electronic sensing means for counting the revolutions of the turbine, the electronic sensing means including a reed switch mounted in a reed housing having lead wires for conducting electricity into and out of the reed switch, a selected one of said lead wires being positioned in a receiving groove formed in the head cover at a location proximate to said turbine to sense fluctuations in a magnetic field created by said turbine upon rotation thereof, said reed housing being disposed in the head cover at a location remote from the turbine.

12. A water filtration system according to claim 11 where the modular turbine casing assembly is disposed in an elbow formed in said clean water outlet so that clean water exits from the modular casing assembly into a transverse passage for carrying clean water out of the system, the transverse passage having an effective internal diameter commensurate with the diameter of the turbine.

13. A fluid filtration system including a fluid flow meter characterized by a substantially constant output having a predetermined variance above a threshold volumetric flow rate and substantially linear relationship between output and volumetric flow rate over a predetermined range of volumetric flow rate below said threshold, the fluid flow meter including a revolution counter commensurate with volumetric flow for generating count data N;

a lapsed time counter for generating a lapsed time data T;

processing means for adjusting the count data N by multiplying N with a predetermined factor F, said factor F being equal to 1 when a threshold count rate is exceeded and F being greater than 1 when the count rate is below said threshold count rate; and output means for alerting a user when an adjusted accumulated count data ΣNF has exceeded a predetermined value selected to indicate that a pre-determined volume of fluid has been filtered or when the lapsed time data T has exceeded a predetermined period.

14. A water filtration system having a head cover removably coupled to a sump container for receiving filtration media therein, the head cover having a first passage defining a raw water inlet and a second passage defining a clean water outlet, both said raw water inlet and said clean water outlets being in fluid communication with said sump container, a modular turbine casing assembly disposed in said clean water outlet, the modular turbine casing assembly having an upstream casing element, a downstream casing element, and a turbine located between said upstream and downstream casing elements, each said upstream and downstream casing elements having a cylindrical wall defining an internal shoulder at an upstream end, and a cooperating external shoulder at a downstream end so that said upstream and downstream casing elements may be stacked, each said upstream and downstream casing elements having a turbine locator consisting of a central hub and a number of radially extending ribs coupling the hub to a circumferential rim adjacent to said cylindrical wall, each hub having a spindle extending toward the upstream end of the casing element and an opposing dimple exposed to the downstream end of the casing element, the turbine having a central hub and a number of radially extending turbine blades coupling the hub to a peripheral collar of predetermined width, the central hub having an axially extending spindle on an upstream side and a recess on a downstream side adapted to cooperate with the dimple of the upstream casing element and the spindle of the downstream casing clement respectively, the turbine being adapted to be magnetized so that rotation of the turbine can be monitored electronically, and the peripheral collar having a height and diameter adapted to locate inside the cylindrical wall of the downstream casing element so that the turbine may rotate freely between the upstream and downstream casing elements;

and a fluid flow meter having electronic sensing means for generating count data N corresponding to the revolutions of the turbine, the electronic sensing means including a reed switch mounted in a reed housing having lead wires for conducting electricity into and out of said reed switch, a selected one of said lead wires being positioned in a receiving groove formed in the head cover at a location proximate to said turbine to sense fluctuations in a magnetic field created by said turbine upon rotation thereof, said reed housing being disposed in the head cover at a location remote from the turbine;

the fluid flow meter further having a lapsed time counter for generating a lapsed time data T;

processing means for adjusting the count data N by multiplying N with a predetermined factor F, said factor F being equal to 1 when a threshold count rate is exceeded and F being greater than 1 when the count rate is below said threshold count rate; and output means for alerting a user when an adjusted accumulated count data ΣNF has exceeded a predetermined value selected to indicate that a pre-determined volume of fluid has been filtered or when the lapsed time data T has exceeded a predetermined period.

* * * * *